Dec. 12, 1939.  A. H. BAYER  2,182,784
FROZEN CONFECTIONERY PRODUCT AND METHOD OF MAKING THE SAME
Filed March 17, 1937  2 Sheets-Sheet 1
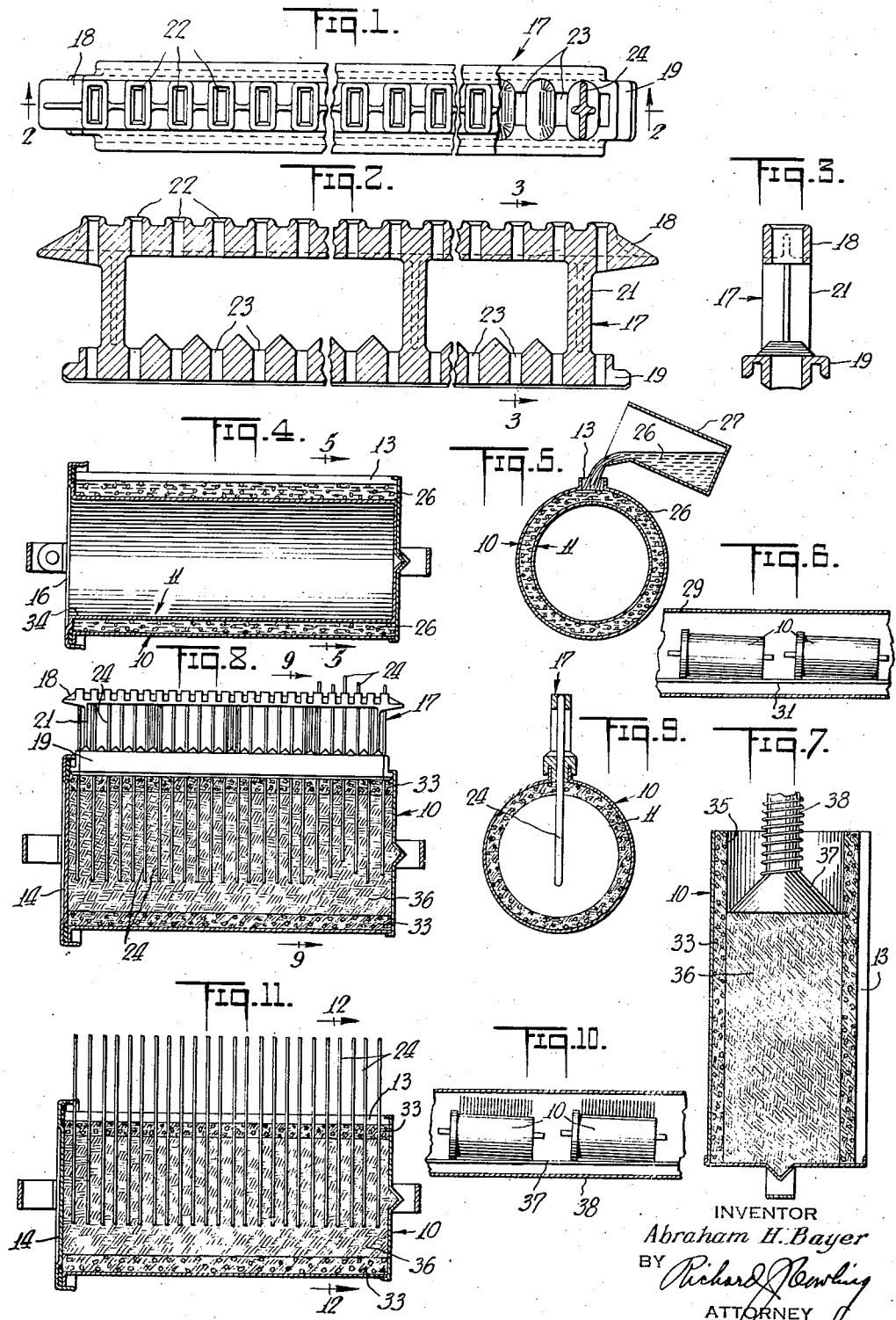
INVENTOR
Abraham H. Bayer Dec. 12, 1939.  A. H. BAYER  2,182,784
FROZEN CONFECTIONERY PRODUCT AND METHOD OF MAKING THE SAME
Filed March 17, 1937  2 Sheets-Sheet 2
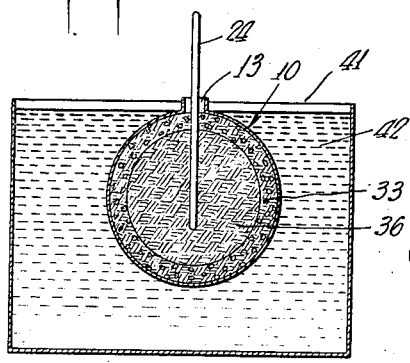
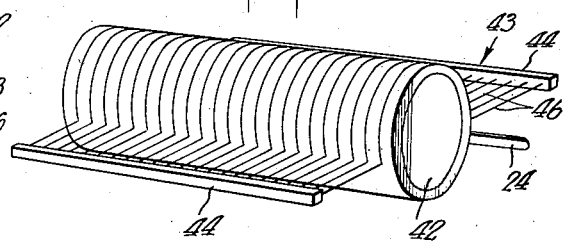
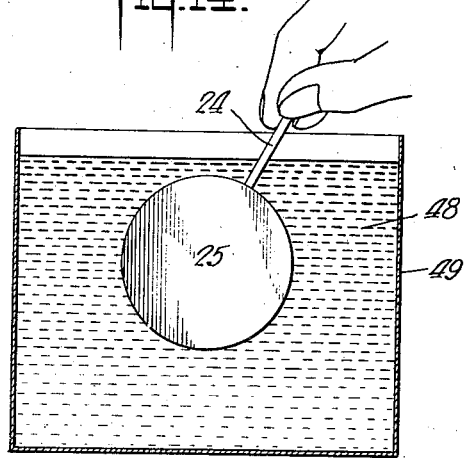
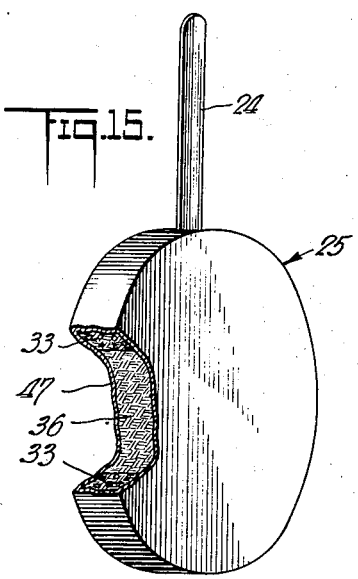
INVENTOR
Abraham H. Bayer
BY Richard Dowling
ATTORNEY Patented Dec. 12, 1939

2,182,784

UNITED STATES PATENT OFFICE 2,182,784

FROZEN CONFECTIONERY PRODUCT AND METHOD OF MAKING THE SAME

Abraham H. Bayer, Schenectady, N. Y., assignor to Joe Lowe Corporation, New York, N. Y., a corporation of Delaware Application March 17, 1937, Serial No. 131,321

6 Claims. (Cl. 99—137)

The present invention relates to confectionery products, and it has particular relation to a frozen confectionery product including a separate true fruit substance containing shredded fruit, which is form retaining and semi-plastic at normal freezing temperatures, and the method of making the same including the fruit substance.

An object of the invention is to provide a new and novel fruit flavored confectionery product having a separate fruit ingredient containing shredded fruit which is form retaining and remains semi-plastic at normal freezing temperatures.

Another object of the invention is to provide a confectionery product of the character described including a separate fruit substance of a semi-plastic and edible nature at normal freezing temperatures combined with a whipped product, such as ice milk, ice cream and/or the like, with or without, a sustaining handle member.

A further object of the invention is the provision of a confectionery product of the character described wherein the fruit substance will develop crystals of impalpable fineness at normal freezing temperatures.

A further object of the invention is to provide a simple, economical and sanitary method of producing a frozen confectionery product of the class described consisting of a number of different substances.

Another object of the invention is the provision of a simple, economical and sanitary method of simultaneously producing a number of frozen confectionery products of the class described having a separate true fruit substance which is form sustaining and which will remain semi-plastic and edible at normal freezing temperatures.

A further object of the invention is to provide a simple and efficient sanitary method of combining a separate true fruit substance of the character described with a whipped product, such as ice milk, ice cream, frozen custard and/or the like, to produce a new and novel confectionery product on a handle stick enrobed in an outer protective coating of edible material which will remain hard at ordinary temperatures.

A further object of the invention is the provision of a simple and inexpensive pure fruit substance which will be form retaining but semi-plastic and edible at normal freezing temperatures.

Another object of the invention is to provide a simple and inexpensive fresh fruit product which will develop only ice crystals of impalpable fineness at normal freezing temperatures.

A further object of the invention is to provide a simple and inexpensive method of preparing a fresh fruit product which will be form retaining but yet remain semi-plastic and edible at normal freezing temperatures.

Another object of the invention is the provision of a simple and inexpensive method of preparing a fresh fruit product in a simple sugar solution which will develop only ice crystals of impalpable fineness at normal freezing temperatures.

Other and further objects and advantages of the invention will be apparent from a detailed description thereof, wherein only preferred forms of embodiment of the invention are shown and described, reference being had to the accompanying drawings, forming a part hereof, in which:

Fig. 1 is a top plan view of a device for positioning and gauging sticks in the confectionery product;

Fig. 2 is a longitudinal sectional view of the device shown in Fig. 1, the same being taken along the lines 2—2 thereof, looking in the direction of the arrows;

Fig. 3 is a cross-sectional view of the device shown in Fig. 1, the same being taken along the line 3—3 of Fig. 2, looking in the direction of the arrows.

Fig. 4 is a cross-sectional view of a mold assembly suitable for use in making the outer fruit casing of my confectionery product, showing the annular space between concentrically spaced molds filled with a fruit syrup to be frozen;

Fig. 5 is a cross-sectional view of the mold assembly shown in Fig. 4, the same being taken along the line 5—5 thereof, looking in the direction of the arrows, and also illustrating a method of filling the mold assembly through the open top of the outer mold with a fruit syrup;

Fig. 6 is a cross-sectional view of a refrigerating tunnel, showing one method of freezing the fruit syrup in the mold assembly shown in Fig. 4, by passing the same through said tunnel on a conveyor belt;

Fig. 7 is a cross-sectional view of the outer mold shown in Fig. 4, illustrating one method of filling the cavity formed in the substance frozen therein upon withdrawal of the inner mold;

Fig. 8 is a longitudinal sectional view of the outer mold and contents shown in Fig. 7, with the device shown in Fig. 2 mounted in position thereon over the opening in the top of the outer mold, and illustrating one method of positioning the handle sticks in the mold contents and gauging the proper distance of immersion therein;

Fig. 9 is a cross-sectional view of the mold assembly shown in Fig. 8, the same being taken along the line 9—9 thereof, looking in the direction of the arrows;

Fig. 10 is a longitudinal sectional view of a refrigerating tunnel, similar to that shown in Fig. 6, and illustrating the step of freezing the inner core and binding the same to the handle sticks;

Fig. 11 is a longitudinal sectional view of the outer mold assembly shown in Fig. 8, with the stick positioning and gauging device removed;

Fig. 12 is a cross-sectional view of the mold assembly shown in Fig. 11, showing the same being partially immersed in a defrosting tank of warm water to break the bond formed between the mold walls and the frozen body to facilitate removal therefrom;

Fig. 13 is a perspective view illustrating one method of cutting the cylindrical frozen body into individual pieces each containing a handle member;

Fig. 14 is a cross-sectional view of a dipping or coating tank, illustrating one method of applying an outer protective coating of edible material to the frozen bodies on the handle members; and Fig. 15 is a fragmentary perspective view, on an enlarged scale, of a confectionery product made in accordance with and embodying the principles of my invention.

While it is essential in carrying out my process in the manufacture of the product to utilize certain mechanical apparatus capable of producing the desired results, I make no claim to the details of construction of the particular apparatus shown in the drawings herein, which I have employed only for illustrative purposes. It is my understanding that this particular apparatus forms the basis of a co-pending application of Norman M. Thomas and William J. Taylor, Serial Number 131,538, filed March 17, 1937, for improvements in Apparatus for molding confectionery products.

In the preparation of the syrupy fruit mix, I use fresh fruit, such as pineapple, raspberry, strawberry, cherry, grape and the citrus fruits, and, after properly cleaning and seeding the same, including the removal of any core, rinds, stems, etc., I shred the same in any conventional way, thereby distributing the insoluble solid matter, such as the fruit pulp, in its own juice. The resultant product of most of these fruits will be found to have a density between seven degrees and ten degrees Brix, depending, of course, on the type of fruit, the condition when shredded, the ripeness when picked, and the soil and climatic conditions during the growing period. To each gallon of the fruit mix I then propose to add one and one-half pounds of crystalline cane and/or beet sugar and one pound of invert sugar. The invert sugar may be added either directly as invert sugar or as equal quantities of anhydrous dextrose and levulose. The resultant admixture will be found to have a density reading between twenty-five to twenty-eight degrees Brix.

The syrupy fruit admixture above described has been found to have certain new and novel properties and characteristics under normal quiescent freezing temperatures. The viscosity of the syrupy admixture is such that only fine and impalpable ice crystals will form at such freezing temperatures, and it will also prevent the coalescence of these fine crystals into larger and grainier aggregations which cannot be eaten at such low temperatures, having the properties and characteristics of ice. When this syrupy admixture is frozen it will be found to be form retaining but at the same time sufficiently semi-plastic to permit eating at such low temperatures. Another characteristic of this syrupy admixture is the fact that it contains all of the edible insoluble matter of the original fruit, including the fruit pulp in shredded form.

Referring now to the drawings, there is shown a mold assembly consisting of an outer mold 10 and an inner mold 11 concentrically spaced to form a hollow cylindrical shell therebetween. The larger or outer mold 10 is of tubular construction of a substantial length relative to its width dimensions having a longitudinal opening 13 extending along the top side thereof and an open end which is adapted to be closed by a suitable cover member 14. The inner or smaller mold 11 is of a hollow tubular construction having a substantial length relative to its width dimensions, forming a single cavity open on one end. A suitable flanged cover member 16 is circumferentially mounted adjacent the open end of the mold 11, which cover member is adapted to close the open end of the outer mold 10 when the inner mold 11 is positioned therein in concentric spaced relation, as best shown in Fig. 4.

A stick positioning and gauging device 17, consisting of a top frame member 18 and a bottom frame member 19 integrally connected by suitable spaced uprights 21. A series of transversely extending vertical slots 22 are spaced longitudinally of the top frame member 18 and extend therethrough, and a second series of correspondingly spaced slots 23 extend through the bottom frame member 19, the slots 22 and 23 being in vertical alignment and adapted to receive a plurality of handle members 24 therein. The device 17 is of a size and shape corresponding to the opening 13 in the top of the outer mold 10 and is adapted to be fitted thereover, as best shown in Fig. 8.

In the manufacture of frozen stick confectionery products 25 of the type shown in Fig. 15, the inner mold 11 is concentrically positioned within the outer mold 10 and the integral flanged cover member 16 closes the open end of the outer mold 10, thereby providing an annular space between the outer surface of the inner mold 11 and the inner surface of the outer mold 10. This space is then manually filled by pouring the syrupy admixture 26 aforementioned from a suitable container 27 through the longitudinal opening 13 along the top side of the outer mold 10, as best shown in Fig. 5. The mold assembly is now ready to be placed in one end of a refrigerating tunnel 29, having a moving conveyor belt 31. When the mold assembly reaches the opposite end of the refrigerating tunnel 29, the syrupy admixture 26 is frozen quiescently to a semi-plastic form retaining condition, as indicated at 32 in Fig. 8. The hollow center cavity 34 of the inner mold 11 is now heated, in any suitable manner, to break the bond formed during the freezing period between the frozen body 32 and the surrounding outer surface of the inner mold 11. When the mold 11 is withdrawn from the outer mold 10 and its frozen body 32, it leaves a hollow cavity 35 therein, as best shown in Fig. 7.

The hollow cavity 35 formed in the frozen body 33 in the outer mold 10 is now ready to be filled with a whipped substance 36, such as partially frozen ice milk, ice cream, frozen custard and/or the like, as such products are generally withdrawn from a conventional ice cream freezer. This filling may be accomplished in any suitable manner, such as by means of a nozzle 37 mounted on the delivery end of a hose 38 which, in turn, is connected to a conventional ice cream freezer (not shown). When the cavity 35 of the mold 10 is completely filled with the second substance 36, the cover member 14 is fastened over the open end of the mold 10, and the latter is then turned to a horizontal position with the longitudinal opening 13 at the top. A stick positioning and gauging device 17 is then manually placed over the opening 13 in the top of the mold 10. Wooden handle members 24 are now positioned in the slotted openings 22 of the top frame member 18 of the device 17, which handle members 24 pass therethrough and through the aligned openings 23 of the bottom frame member 19 until the lower ends thereof are in contact with the frozen fruit body 33 in the mold 10. The handles 24 must now be manually forced into and through the frozen fruit body 33 until the lower ends thereof are imbedded in the unfrozen substance 36 and the top ends of the handle members 24 are flush with the top of the top frame member 18 of the device 17, as best shown in Fig. 8. The spacing of the frame members 18 and 19 of the device 17 act as a gauge for the proper positioning of the handle members in the substances in the mold 10, and control the distance of projection into the frozen body.

The mold 10 is now ready to be subjected to further refrigeration until the substance 36 is completely frozen and bonded both to the frozen fruit shell 33 and the handle members 24, and the frozen fruit shell is also bonded directly to the handle members 24. This freezing may be accomplished in any suitable manner, such as placing the molds in a hardening room having refrigerating temperatures, or by redepositing the charged molds 10 on a conveyor belt 37 passing through a refrigerated tunnel 38, as shown in Fig. 10.

When the mold 10 has been removed from the refrigerating medium, and the substances 33 and 36 therein have been frozen and bonded to each other and to the handle members 24 by congelation, it may be dipped momentarily in a defrosting tank 41, containing warm water 42, suitable for melting the bond formed between the inner surface of the mold 10 and the frozen fruit shell 33. The cover member 14 is now removed from the open end of the mold 10, and the contents may be manually withdrawn by sliding the same longitudinally out through said open end of the mold 10. The frozen mass 42, when withdrawn from the mold 10, is of cylindrical shape, having a series of longitudinally spaced handle members 24 partially protruding therefrom. In order to separate this mass 42 into individual confections 25, the same is cut transversely, in any suitable manner, such as for example, by means of a gang cutter 43, consisting of spaced frames 44 having a plurality of spaced wires 46 connected thereto. These wires 46 are spaced to cut a confectionery product of the desired width, and, in the illustration shown in Fig. 13, are adapted to pass through the frozen body 42 intermediate the handle stick members 24, thereby separating the same into a plurality of individual confections 25, each containing a single handle member 24.

The confectionery products 25 are now ready to be enrobed in an edible outer protective coating 47, such as chocolate which remains hard and firm at ordinary room temperatures. This protective outer coating 47 may be applied by taking the protruding end of the handle member 24 in the hand and manipulating the frozen confectionery body 25 bonded to the opposite end thereof through a bath of molten chocolate 48, or other similar material, contained in a tank 49, by merely dipping the same momentarily therein. The extreme coldness of the frozen body will instantly solidify the liquid coating material 48 adhering to the surface of the frozen body, thereby providing an outer protective coating 47 therefor. The confectionery products are now ready to be eaten, placed in bags ready for boxing, storage or shipping, as desired.

The confectionery product 25 shown in Fig. 15, consists of an inner core of whipped material 36, such as ice cream and the like, an outer casing 33 of a frozen fruit substance of a semi-plastic nature, and a protective outer coating 47 completely enrobing both substances combined on a handle member 24, the fruit substance 33 being characterized by the fact that it is form retaining but yet plastic and edible at normal freezing temperatures at which such products are consumed.

When normal or room temperatures are referred to herein, it is meant those temperatures prevailing during the summer months of the year or indoors during the winter months, such as for example between 60 degrees F. and 90 degrees F.; and when normal freezing temperatures are referred to herein, it is meant those temperatures at which frozen confectionery products are generally frozen and/or served, namely, between plus 15 degrees F. and minus 15 degrees F.

Although I have only described in detail one embodiment of the invention, it will be apparent to those skilled in the art that the invention is not so limited, but that various other modifications may be made therein without departing from the spirit thereof or from the scope of the appended claims.

What I claim is:

1. As a new article of manufacture, a frozen confectionery product comprising, in combination, an edible substance which is liquid at normal temperatures and becomes solidly frozen at normal freezing temperatures, and a separately formed fruit admixture bonded thereto by congelation, said fruit admixture consisting of the edible insoluble matter of a whole fruit suspended in its own juice and combined with invert sugar, the essential characteristics of said admixture being its property to remain liquid at normal temperatures and to become plastic and yet be form retaining at said normal freezing temperatures.

2. As a new article of manufacture, a frozen confectionery product comprising, in combination, an edible substance which is liquid at normal temperatures and becomes solidly frozen at normal freezing temperatures, and a separately formed fruit admixture bonded thereto by congelation, said fruit admixture consisting of the edible insoluble matter of a whole fruit suspended in its own juice and combined with crystalline sugar and equal parts of anhydrous dextrose and levulose, the essential characteristics of said admixture being its property to remain liquid at normal temperatures and to become plastic and yet be form retaining at said normal freezing temperatures.

3. As a new article of manufacture, a frozen confectionery product comprising, in combination, an edible substance which is liquid at normal temperatures and becomes solidly frozen at normal freezing temperatures, and a separately formed fruit admixture bonded thereto by congelation, said fruit admixture consisting of the edible insoluble matter of a whole fruit suspended in its own juice and combined with sufficient added quantities of crystalline and invert sugar to raise its density to between 25 and 28 degrees Brix, the essential characteristics of said fruit admixture being its property to be liquid at normal temperatures and develop only crystals of impalpable finess and to prevent their coalescence into larger and grainier aggregations under refrigerating temperatures.

4. The method of making a composite frozen confectionery product having a handle member positioned therein which comprises forming a hollow shell by freezing a syrupy fruit admixture which is liquid at normal temperatures consisting of the edible insoluble matter of a whole fruit suspended in its own juice and combined with invert sugar until the same is form retaining, filling said shell with a second whipped substance which is liquid at normal temperatures and congeals upon refrigeration, forcing a handle stick through the outer frozen shell until the lower end thereof is immersed in the unfrozen whipped second substance, subjecting the second substance to refrigeration until it is bonded to the first substance and to the handle member, thereby forming an integral unit, and then applying an outer edible protective coating to both substances, which coating is of a material that will remain hard at normal room temperatures.

5. The method of making a plurality of composite frozen stick confections simultaneously which comprises forming an outer shell of a syrupy fruit admixture consisting of the edible insoluble matter of a whole fruit suspended in its own juice and combined with crystalline sugar and equal parts of anhydrous dextrose and levulose, which is liquid at normal temperatures and congeals upon refrigeration into a form retaining plastic mass, filling said shell with a second whipped substance which is liquid at normal temperatures and congeals upon refrigeration, spacing a plurality of handle members longitudinally of said shell by forcing the same through the outer frozen surface until the lower ends thereof are projecting into the second substance, subjecting the mass to refrigeration until the two substances are bonded to each other and to the handle sticks, and then transversely cutting the integral mass between the spaced handle sticks to produce a plurality of individual pieces each having a handle stick partially embedded therein.

6. The method of making a plurality of composite frozen stick confections simultaneously which comprises forming an outer shell of a syrupy fruit admixture consisting of the edible insoluble matter of a whole fruit suspended in its own juice and combined with sufficient added quantities of crystalline and invert sugar to raise its density to between 25 and 28 degrees Brix, which is liquid at normal temperatures and congeals upon freezing into a plastic form retaining edible mass, filling said shell with a second partially frozen substance which is liquid at normal temperatures and congeals upon refrigeration, spacing a plurality of handle members longitudinally of said shell by forcing the same through the outer frozen surface until the lower ends thereof are projecting into the second partially frozen substance, subjecting the mass to refrigeration until the two substances are bonded to each other and to the handle sticks, transversely cutting the mass between the spaced handle sticks to produce a plurality of individual pieces each having a handle stick partially embedded therein and then applying an edible outer protective coating to the edible portions of the individual confections, which coating will remain hard at normal room temperatures.

ABRAHAM H. BAYER.